May 17, 1932. E. C. GOEBERT ET AL 1,858,495
GUN CARRIAGE
Filed April 2, 1931 3 Sheets-Sheet 1
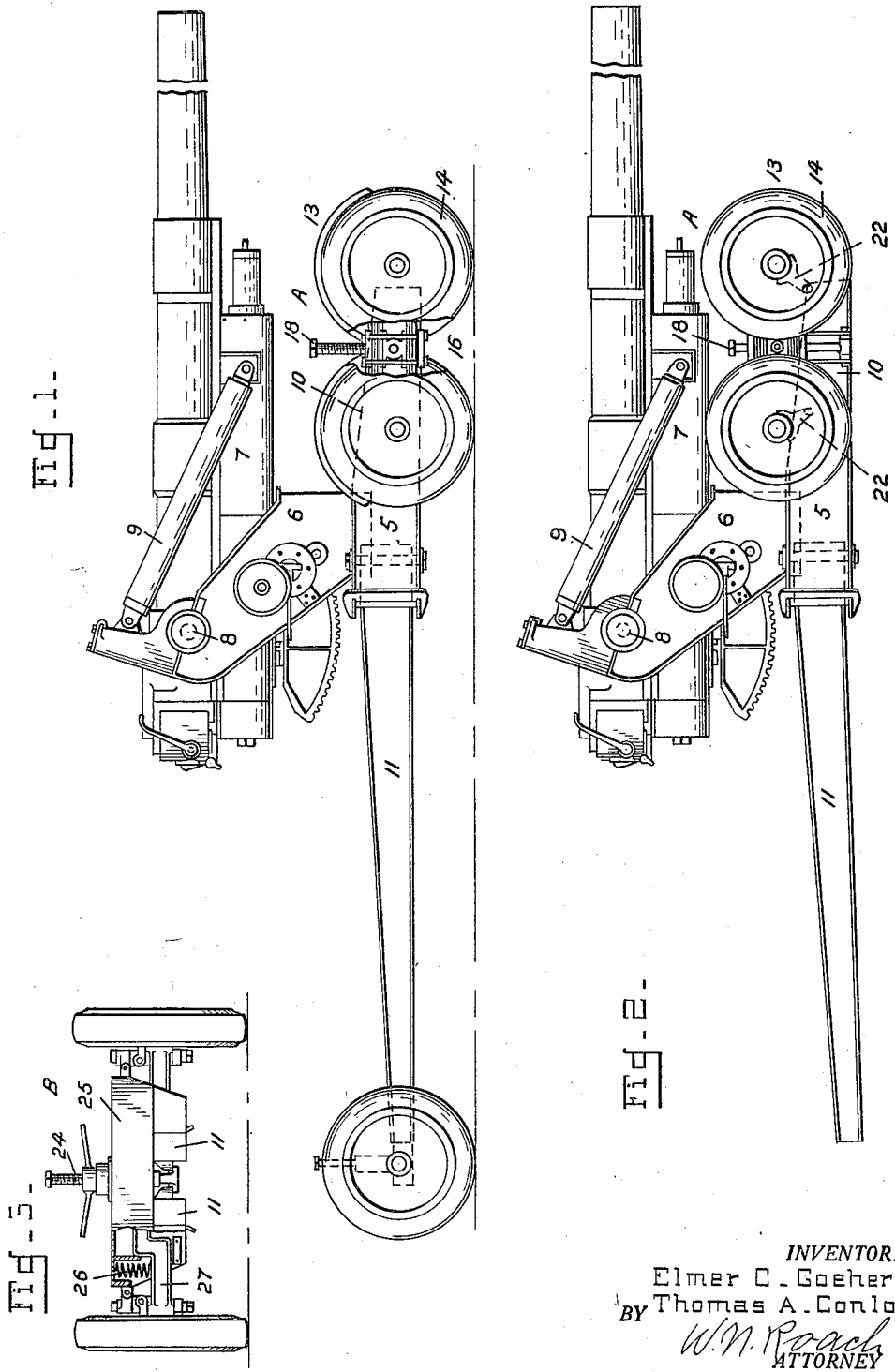
INVENTORS
Elmer C. Goebert
Thomas A. Conlon
BY W. N. Roach
ATTORNEY May 17, 1932.　　　E. C. GOEBERT ET AL　　　1,858,495
GUN CARRIAGE
Filed April 2, 1931　　　3 Sheets-Sheet 2

INVENTORS
Elmer C. Goebert
Thomas A. Conlon
BY
W. N. Roach
ATTORNEY

INVENTORS
Elmer C. Goebert
Thomas A. Conlon
BY W. N. Roach
ATTORNEY

Patented May 17, 1932

1,858,495

UNITED STATES PATENT OFFICE

ELMER C. GOEBERT, OF THE UNITED STATES ARMY, PHILADELPHIA, PENNSYLVANIA, AND THOMAS A. CONLON, OF SILVER SPRING, MARYLAND

GUN CARRIAGE

Application filed April 2, 1931. Serial No. 527,189.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty therein.

The subject of this invention is a gun carriage.

Wheeled gun carriages constituting field mounts for the larger caliber guns are of such great weight that the tasks of transporting and emplacing them present a serious problem. A method frequently resorted to consists in separating the mount into two loads, the gun barrel being removed and carried on a transport wagon. In addition to requiring greater road-space the operation of moving the gun off and onto the cradle consumes considerable time and involves the provision of extra equipment. The method of mounting on the trails substitute track-laying units adapted to distribute the load adds undesirable weight.

With a view to increasing the mobility of the carriage and at the same time providing for rapidly placing the mount into and out of firing position the gun carriage forming the subject of the present invention is mounted on a multiple wheel bogie unit adapted to afford high speed of transportation as well as low unit ground-pressure. The bogie overlies a portion of the mount and carries elevating and depressing means to lower the mount to the ground and to raise it from the ground.

A further object of the invention is to provide a system of transportation and emplacement whereby a bogie unit overlying each end of the mount is arranged to pick up the load, the mount serving as a chassis frame.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the gun carriage shown in the travelling position, a portion broken away.

Fig. 2 is a view in side elevation of the carriage in semi-fixed emplacement, the mount resting on the ground.

Fig. 3 is a view in front elevation partly in section of the auxiliary steering bogie.

Figure 4:
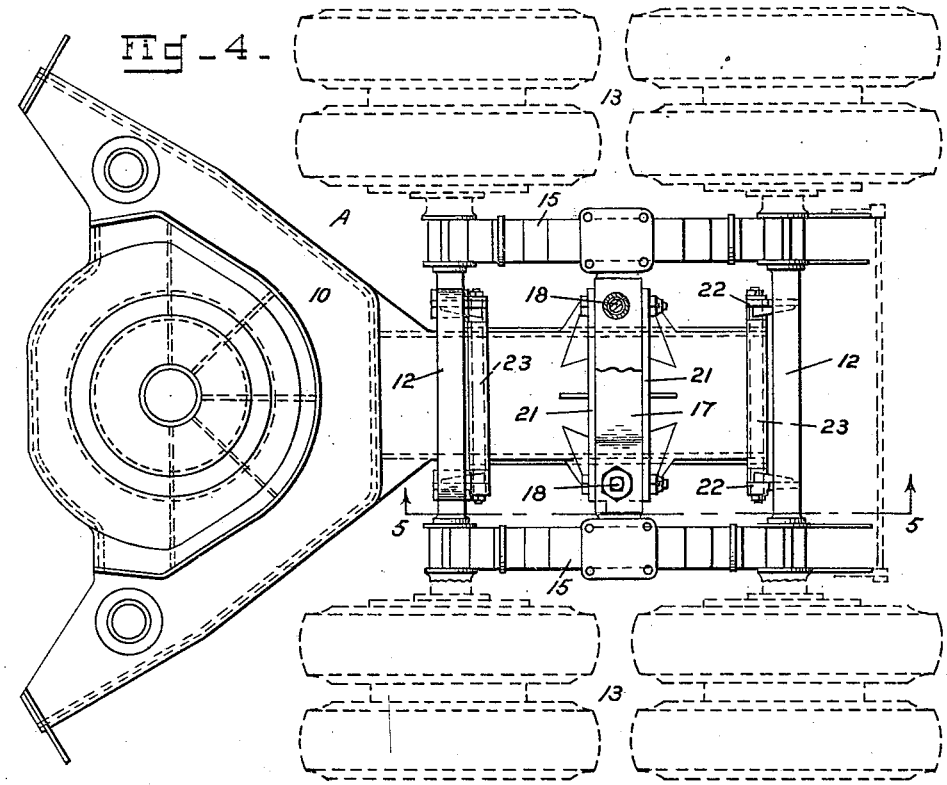
Fig. 4 is a plan view of the main bogie unit and showing a plan of the base of the mount.

Referring to the drawings by characters of reference:

There is shown a pedestal gun mount consisting generally of a base or bottom carriage 5 supporting a top carriage 6 in which a gun cradle 7 is trunnioned as at 8 adjacent the breech to provide ground clearance in high angle firing. The muzzle preponderance of the tipping parts is counterbalanced by equilibrators 9.

The base is formed with a projecting arm 10 to provide a connection for the main bogie unit A while a pair of split trail members 11—11 hinged to the opposite side of the base and serving in their normal capacity when the mount is emplaced, provide a connection for a steering bogie unit B.

The main bogie A is a twin axle unit of a more or less conventional type employed on automobile trucks and consequently immediately available in quantity in the event of an emergency. This unit consists of a pair of axles 12—12 each axle carrying twin wheels 13—13 equipped with pneumatic tires 14. The axles are connected at each of their ends by a pair of vertically spaced sets 15—15 of leaf springs between which is centrally secured a seat 16.

A frame comprising a cross-beam 17 is trunnioned in the spring seat 16 (Figs. 4 to 7) and carries an elevating and depressing mechanism consisting of a pair of spaced screw-jacks 18—18 whose lower extremities may be attached by means of pins 19—19 to spaced ears 20 provided on each side of the arm 10 of the bottom carriage 5.

Figure 5:
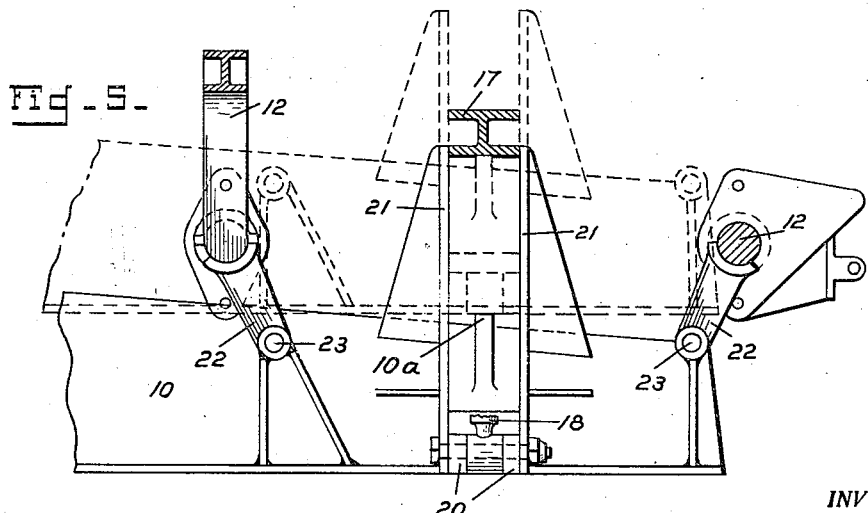
Fig. 5 is a sectional view substantially on the line 5—5 of Fig. 4.
Figure 6:
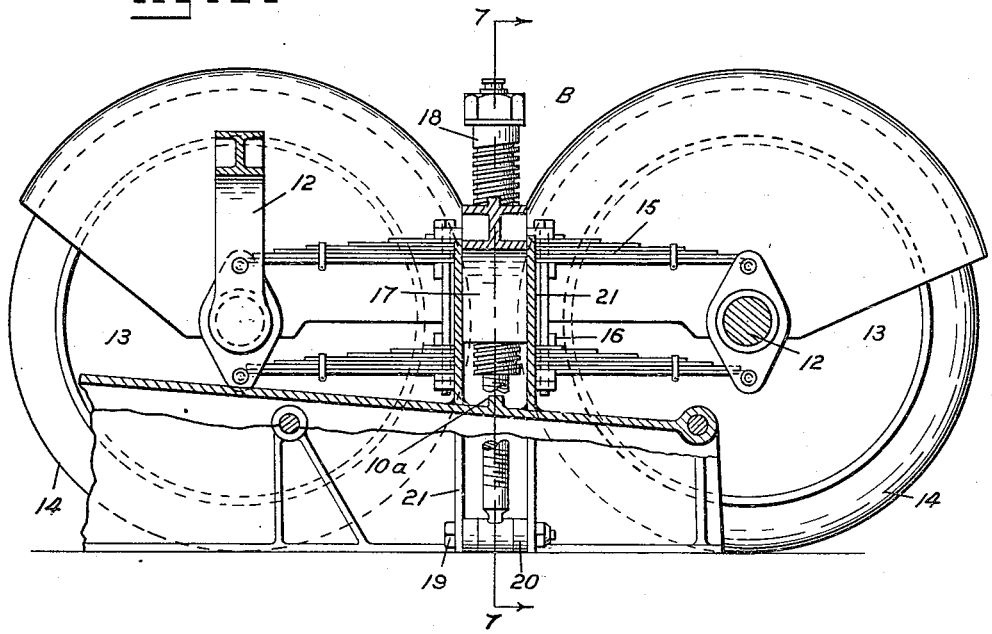
Fig. 6 is a longitudinal sectional view through the main bogie.
Figure 7:
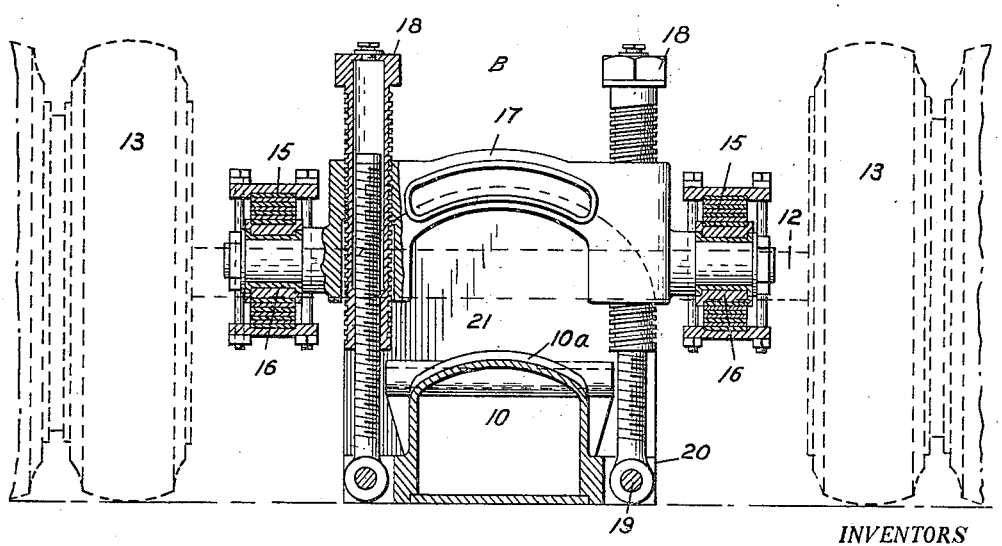
Fig. 7 is a sectional view on the line 7—7 of Fig. 6.

In the travelling position the arm 10 is elevated to the position shown in dotted lines in Fig. 5 where a transverse rib 10a fits against the arched center portion of the cross-beam 17 and is clamped thereto by the jacket 18. Spaced cheek plates 21—21 on the arm preferably embracing three sides of the arm embrace the cross-beam and serve as a guide during raising and lowering of the arm and form a channel to house the lower portion of the screw-jacks 18. The cheek plates also establish an effective connection between the load and the supporting unit when the gun carriage is in motion.

In the emplaced position (Figs. 1, 5 and 7) the bottom carriage and the arm 10 rest on the ground. Continued operation of the screw-jacks serves to raise the bogie from the ground and add its weight to the mount. In order to clamp the bogie in this position as well as to take the load off of the springs there is provided a support for each axle unit. This support consists of a pair of arms 22—22 positioned on each side of the arm 10 of the bottom carriage and preferably fixed on the ends of a shaft 23 journaled in the arm 10. The free extremities of the arm 22 are shaped to fit on the axle. After the supports have been moved into engagement with the axles the screw jacks are operated to lower the bogie and thereby securely clamp the axles to the arms 22.

The steering bogie unit B (Fig. 3), employed to support the trail members in the travelling position, will be but briefly described as it forms the subject of a separate application. As related to the present invention the bogie B resembles the bogie A in the fact that it carries an elevating and depressing mechanism in the form of the screw-jack 24 mounted in an axle housing 25 yieldingly suspended through springs 26 on a crank axle 27. When the bogie B is run into position to straddle the trail members, the screw-jack is engaged with both trail members and then operated to raise the load.

The operation of emplacing the mount consists in operating the screw-jacks of the bogies A and B until the bottom carriage and the trail members rest on the ground. The screw-jack 24 of the bogie B is then disconnected from the trails and the bogie wheeled away to permit spreading of the trails. The bogie A is either employed to augment the weight of the mount by engaging the support arms 22 with the axles of the screw-jacks or may be disconnected by removal of the pins 19 to permit removal of the bogie.

The operations involved in preparing the mount for travelling are exactly the reverse of those carried out in emplacing it.

We claim.

1. In a gun carriage, a pedestal mount, a projecting arm on one side of the mount, a trail on the other side of the mount, a mobile supporting unit having a frame overlying the projecting arm, an elevating and depressing connection between the supporting unit and projecting arm, a mobile supporting unit having a frame overlying the trail, and an elevating and depressing connection between said supporting unit and the trail.

2. In a gun carriage, a pedestal mount, a trail on one side of the mount, a projecting arm on the opposite side on the mount, spaced cheek plates extending on three sides of the arm, a bogie having a trunnioned cross-beam overlying the arm and receivable between the cheek plates, a pair of screw-jacks carried by the cross-beam and housed between the cheek plates, and means for connecting the screw-jacks to the arm.

3. In a gun carriage a load member having a guide, a bogie comprising a pair of axles, wheels on the axles, sets of spaced springs connecting the axles, a seat centrally carried by each set of springs, a frame trunnioned in the seats and confined by the guide on the load member within the limits of relative movement of the bogie and load member, and screw-jacks carried by the frame and attached to the load member.

4. In a gun carriage, a bogie comprising a pair of axles, wheels on the axles, sets of spaced springs connecting the axles, a seat centrally carried by each set of springs, a frame trunnioned in the seats, and screw-jacks carried by the frame.

5. In a gun carriage, a load member having a guide, a bogie having a frame overlying the load member and engageable with the guide, and an elevating and depressing connection between the frame and load member.

6. In a gun carriage, a load member, a bogie having a frame overlying the load member, screw-jacks carried by the frame and attachable to the load member, and swinging, rigid supporting members carried by the load member and engageable with the bogie.

7. In a gun carriage, a load member, a bogie having a frame overlying the load member, screw-jacks carried by the frame and attachable to the load member, and means carried by the load member for supporting the bogie.

8. In a gun carriage, a bogie comprising a plurality of axle units, means for connecting the axle units, a frame trunnioned in the connecting means, and screw-jacks carried by the frame.

ELMER C. GOEBERT.
THOMAS A. CONLON.